United States Patent
Seidl et al.

(10) Patent No.: US 12,516,483 B2
(45) Date of Patent: Jan. 6, 2026

(54) DEVICE FOR THE MIGRATION OF AQUATIC ANIMALS

(71) Applicant: flusslauf Ingenieurbüro für Gewässerökologie und Wasserbau e.U., Graz (AT)

(72) Inventors: Georg Seidl, Graz (AT); Christoph Wagner, St. Peter (AT)

(73) Assignee: flusslauf Ingenieurbüro für Gewässerökologie und Wasserbau e.U., Graz (AT)

( * ) Notice: Subject to any disclaimer, the term of this patent is extended or adjusted under 35 U.S.C. 154(b) by 177 days.

(21) Appl. No.: 18/469,669

(22) Filed: Sep. 19, 2023

(65) Prior Publication Data

US 2024/0093450 A1 Mar. 21, 2024

(30) Foreign Application Priority Data

Sep. 19, 2022 (EP) .................................... 22196360

(51) Int. Cl.
*E02B 8/08* (2006.01)
*A01K 61/00* (2017.01)

(52) U.S. Cl.
CPC .............. *E02B 8/085* (2013.01); *A01K 61/00* (2013.01)

(58) Field of Classification Search
CPC . E02B 1/006; E02B 8/08; E02B 8/085; A01K 61/00
USPC .............................................. 405/81, 82, 83
See application file for complete search history.

(56) References Cited

U.S. PATENT DOCUMENTS

| | | | |
|---|---|---|---|
| 1,621,170 A | 3/1927 | Landau | |
| 7,708,494 B2* | 5/2010 | McLaughlin | ............. E02B 8/08 |
| | | | 405/80 |
| 2017/0241093 A1* | 8/2017 | Bertrand | ................. E02B 8/085 |

FOREIGN PATENT DOCUMENTS

| | | | | |
|---|---|---|---|---|
| AT | 520908 A2 | 8/2019 | | |
| CN | 112942264 A | * | 6/2021 | ............. E02B 8/085 |
| CN | 113882332 A | * | 1/2022 | |
| DE | 3741986 A1 | * | 10/1988 | |
| EP | 3214225 A1 | | 9/2017 | |
| JP | H0881945 A | * | 3/1996 | |

* cited by examiner

*Primary Examiner* — Frederick L Lagman
(74) *Attorney, Agent, or Firm* — Workman Nydegger

(57) ABSTRACT

The device for the migration of aquatic animals has a channel body with an upstream end and a downstream end as well as a longitudinal axis. The bottom of the channel body is provided with a cover layer made of natural bottom substrate and/or debris material and has a ridge running along the longitudinal axis. Plate-shaped lamellae are arranged in the channel body transversely to the longitudinal axis of the channel body. The lamellae have a downwardly open lower cut-out, which is limited at the top by a transverse element, wherein the cross-sectional area of the lower cut-out is dimensioned in such a way that the ridge of the cover layer may be accommodated in the lower cut-out. The upper edge of the transverse element has a preferably curved contour, which is inclined towards the centre of the channel and defines a lower boundary of an upper cut-out of the lamellae extending upwards from the transverse element.

12 Claims, 4 Drawing Sheets

DEVICE FOR THE MIGRATION OF AQUATIC ANIMALS

BACKGROUND OF THE INVENTION

Field of the Invention

The invention relates to a device for the migration of aquatic animals. This device is adapted to be arranged on a body of water separated by a barrier into a tailwater and a headwater and to enable the migration of aquatic animals between the tailwater and the headwater of the body of water. In particular, the invention relates to further developments of the Denil fish ladder known.

Description of Related Art

The Denil fish ladder is a technical fish migration aid having a long tradition. Already at the beginning of the 20th century, the original form of the Denil fish ladder was constructed and achieved good results with regard to salmon migration. The functional principle of the Denil fish ladder is based on the fact that lamellae inserted into a usually strongly inclined channel body create turbulence, which subsequently causes a backwater effect of the flowing water, whereby the flow velocities within the migration corridor, especially in the middle of the stream, are slowed down accordingly. Due to this effect it is possible for fish to migrate upstream at a significantly higher gradient and with a significantly lower space requirement. This aspect provides a striking advantage in terms of space and cost compared to other widespread fish ladder systems, such as, for example slot ladder, basin ladder and bypass channel.

The document U.S. Pat. No. 1,621,170 discloses a basin ladder, also called a "fish ladder", which serves for enabling the migration of fish upstream, for example over a transverse structure in a river. However, this device requires large-scale structural measures. For example, the basin cascades have to be elaborately dug into the ground and/or concreted therein next to the river. These construction measures thus entail both ecological and economic disadvantages.

Whereas in a slot ladder, a basin ladder or a bypass channel, the total height is bridged in sections by stringing together individual basins, in a Denil fish ladder the reduction in height is continuous.

The configurations known of the Denil fish ladder usually show poor passability for small fish species and juvenile fish stages. On the one hand, this is due to the high turbulence in the fish ladder, for which these aquatic animals lack the strength to overcome. On the other hand, small fish species, juvenile fish stages and several species of other aquatic animals, including numerous large cyprinids, have a strong bottom attachment, which will lead to a potential reduction in the efficiency of conventional Denil fish ladders.

The document EP 3 214 225 A1 discloses a further development of the Denil fish ladder, in which plate-shaped lamellae are provided with cut-outs that first taper downwards with straight side edges and then transition into a section with straight, parallel side edges. This arrangement significantly reduces the flow velocity at the bottom by means of the cross-connections of the lamellae close to the bottom. However, this arrangement of lamellae creates turbulence, which results in a strong flow impulse that is oriented upwards. Sampling of such further developed Denil fish ladders has shown that small fish species and bottom-oriented migrants are underrepresented. According to the inventor, this is mainly due to the high flow velocities that are oriented upwards and the high turbulent kinetic energy. Thus, in the previously known embodiments of Denil fish ladders, the upward flow velocities in the direction of a normal to the longitudinal axis of the channel body will exceed those along the longitudinal axis of the channel body. In this way, the small fish lose their orientation during the passage through the fish ladder or drift away in the turbulence, which is why their migration upstream will be inhibited.

From the document AT 520908 A1, another further development of the Denil fish ladder is known, which aims at rendering the Denil fish ladder surmountable also for small fish species, juvenile fish stages and generally for aquatic animals having a strong attachment to the bottom. In this embodiment, the bottom of the channel body is provided, at least in sections along the longitudinal axis of the channel body, with a cover layer made of natural bottom substrate and/or debris material and has a ridge of constant height running along the longitudinal axis. The lamellae, which are arranged transversely to the longitudinal axis, are formed in two parts from a right partial lamella and a left partial lamella, each of which abutting laterally the ridge. In addition to the biological advantages of this fish migration aid, however, it had to be noted that in order to establish a stable flow velocity profile, there will be required significantly higher amounts of residual water than the original Denil fish ladder will require.

BRIEF SUMMARY OF THE INVENTION

There is therefore a continuing demand for an improved ascent aid for aquatic animals with some or all of the following properties:
- Stabilisation of the flow profile of the ascent aid for aquatic animals,
- Reduction of flow velocities in the ascent aid for aquatic animals,
- Reduction of turbulence in the ascent aid for aquatic animals,
- Reduction of the required water flow through the ascent aid for aquatic animals,
- Creation of extended resting zones for small fish in the ascent aid for aquatic animals.

The present invention solves the task posed by providing a device for the migration of aquatic animals. Advantageous embodiments of the invention are disclosed in the claims, the specification and the drawings.

The device for migration of aquatic animals according to the invention comprises at least one channel body having an upstream end and a downstream end, wherein the channel body has a longitudinal axis extending between the upstream end and the downstream end, wherein the bottom of the channel body is provided, at least in sections along the longitudinal axis of the channel body, with a cover layer made of natural bottom substrate and/or debris material, wherein the cover layer has a ridge extending essentially along the longitudinal axis, and wherein plate-shaped lamellae are arranged in the channel body transversely to the longitudinal axis of the channel body. The lamellae have a downwardly open lower cut-out, which is limited at the top by a transverse element. The cross-sectional area of the lower cut-out is dimensioned in such a way that the ridge of the cover layer may be accommodated in the lower cut-out. The upper edge of the transverse element has a contour, which is inclined towards the centre and defines a lower boundary of an upper cut-out of the lamellae extending upwards from the transverse element.

The contour of the upper edge of the transverse element, which is inclined towards the centre, causes the upper cut-out of the lamella, which is limited at the bottom by the transverse element, to taper downwards. The terms "up" and "down" herein refer to the installation position of the lamellae within the device for the migration of aquatic animals. The term "towards the centre" refers to the width direction of the lamella.

A uniform flow pattern of the water in the channel body and reduced symmetrical turbulence will be the result when the contour of the upper edge of the transverse element is symmetrical with respect to a bisector of the width of the lamella.

Preferably, the upper edge of the transverse element has a curved contour, at least in some sections. The curved contour ensures a further reduction of turbulence. This positive effect is enhanced if the curved contour of the upper edge of the transverse element consists exclusively of curved sections, i.e. has no straight sections.

Due to the simpler manufacturability of the lamellae, it may be useful for alternative embodiments of the lamella to configure the contour with straight sections and thereby accept a somewhat less favourable flow course of the water in the channel body and less reduced turbulence. This embodiment may be taken into consideration especially if the device for the migration of aquatic animals has to overcome only a small gradient or only small difference in height between headwater and tailwater.

Particularly good results with regard to the properties of the device that are required above for the migration of aquatic animals are achieved if a central section of the curved contour of the upper edge of the transverse element is configured to be convex. The term "convex" is to be understood in the mathematical sense, i.e. that the course of the contour is situated below each connecting section of two of its points.

The best hydraulic results are achieved if the convex central section is configured to be parabolic with the parabola vertex as the lowest point.

In order to further improve the above-defined properties of the device for the migration of aquatic animals according to the invention, there is provided in one embodiment that concave side sections adjoin the convex central section on both sides, whereby the concave side sections preferably form the end sections of the curved contour of the upper edge of the transverse element. However, concave end sections are also useful if they adjoin straight sections of the contour of the upper edge of the transverse element. The term "concave" is herein to be understood in the mathematical sense, i.e. that the course of the contour is situated above any connecting section of two of its points.

If the transverse element is formed as an independent, preferably replaceable component, such transverse elements may be used to retrofit conventional Denil fish ladder according to the invention and the lamellae of devices for the migration of aquatic animals according to the invention may be quickly repaired or adapted to a changed water flow.

For good passability of the device for migration of aquatic animals for small fish and bottom-oriented fish species, it is useful that the height of the ridge of the cover layer is substantially constant along the longitudinal axis of the channel body.

The invention will now be explained in greater detail by way of exemplary embodiments with reference to the drawings.

DETAILED DESCRIPTION OF THE EMBODIMENTS

Figure 1:
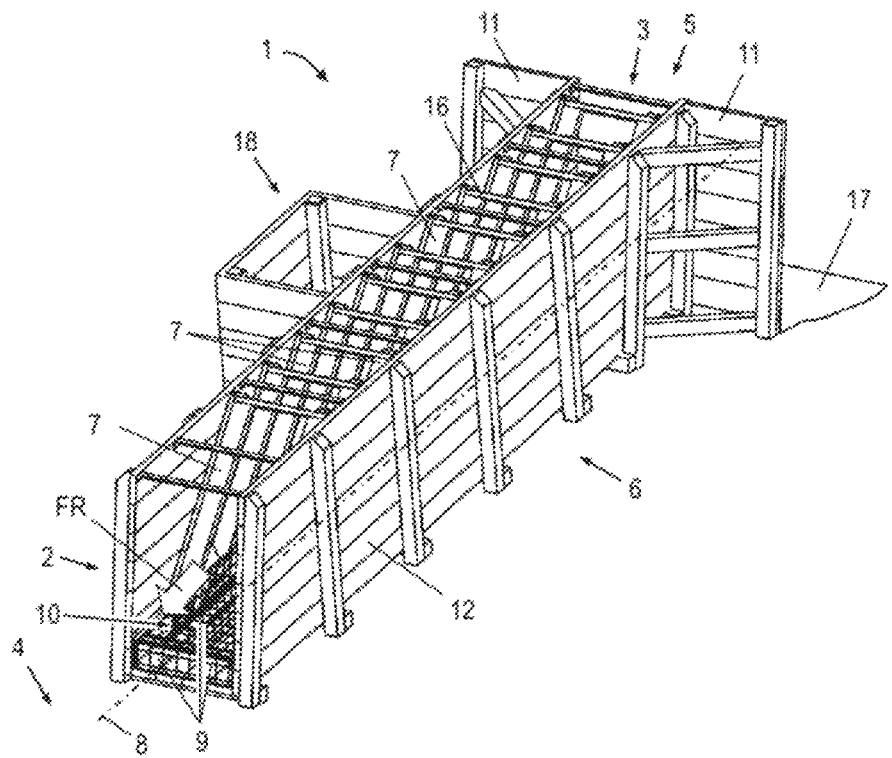
FIG. 1 shows an oblique view from above of a first exemplary embodiment of a device according to the invention for the migration of aquatic animals.
Figure 2:
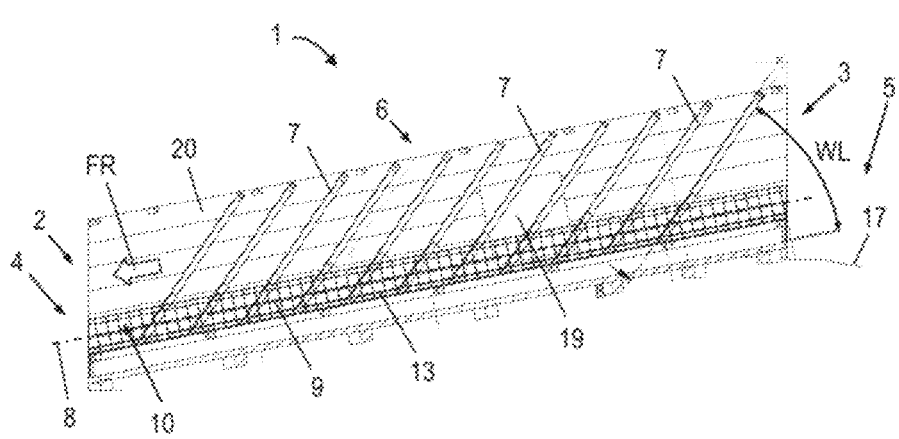
FIG. 2 shows a longitudinal section along the longitudinal axis of the device according to the invention from FIG. 1.

FIGS. 1 and 2 show in a schematic depiction an embodiment of a device 1 for the migration of aquatic animals according to the invention. By means of this device 1, aquatic animals may overcome a barrier in a body of water and migrate from tailwater 4 to headwater 5 of the body of water, or vice versa. If the body of water is a flowing body of water, for example a river or a stream, the device 1 is arranged essentially along a flow direction FR.

The device 1 comprises a channel body 6 with an upstream end 3 communicating with the headwater 5 and with a downstream end 2 communicating with the tailwater 4. The channel body 6 extends along a longitudinal axis 8. Consequently, the water flows from headwater 5 substantially along the flow direction FR or along the longitudinal axis 8, respectively, into the tailwater 4. The device 1 may have end walls 11 in the area of the upstream end 3.

Furthermore, upstream of the upstream end 3, the device 1 may have a rubber blanket 17 in the area of the bottom to counteract undercutting. The rubber blanket 17 may be covered with bottom substrate and/or debris material.

The device 1 may further comprise a light well 18, wherein the light well 18 is arranged laterally of the channel body 6 and wherein a viewing window 19 may be formed in a side wall 12 of the channel body 6 within the light well 18.

Plate-shaped lamellae 7 are arranged within the channel body 6 at essentially equal distances transverse to the longitudinal axis 8. These lamellae 7 cause a backwater effect of the flowing water, which slows down the flow velocity accordingly. The lamellae 7 are inserted in an inclined position in the direction of the upstream end 3 of the channel body 6. The angle WL defining the inclined position of the lamellae 7 is, for example, 45 angular degrees. In some embodiments, the lamellae 7 may also be arranged vertically.

The bottom of the channel body 6 is provided along the longitudinal axis 8 at least in some sections, but preferably over the entire length of the channel body 6, with a cover layer 9 made of natural bottom substrate or debris material or a mixture of natural bottom substrate and debris material. In addition, gravel may be introduced into the cover layer 9. Gravel is a wear-resistant, crushed stone and may further reduce the flow velocity of the body of water near the bottom.

The cover layer 9 has a ridge 10 running essentially along the longitudinal axis 8. Below the ridge 10, the cover layer 9 may be introduced over the entire width of the bottom of the channel body 6, wherein the width is defined as running transversely to the longitudinal axis 8 of the channel body 6. The ridge 10 of the cover layer 9 preferably runs centrally with respect to its width. The cross-sectional shape of the cover layer 9, but in particular of the ridge 10, may be defined by gabions 13, which are basket- or cage-like structures, usually made of metal bars or grids, in the desired cross-sectional shape. The natural bottom substrate, the debris material and/or the gravel are secured against discharge and rearrangement by the gabions 13. The lamellae 7 may be attached to the gabions 13. If the lamellae 7 rest directly on the bottom of the channel body 6, they may be fixed there. In any case, the lamellae 7 may be attached to the side walls 12 of the channel body 6. As a rule, however, the lamellae 7 are guided in rails so that they may be pulled out in order to simplify the maintenance of the fish ladder.

The introduction of debris material and/or gravel into the channel body 6 provides aquatic animals with a continuous gravel gap space, whereby the probability of a successful migration may be increased and the upward migration of macrozoobenthic species (gravel gap-dwelling insect larvae) and bottom-attached fish may be made possible. This makes the barrier generally surmountable for aquatic organisms having a strong attachment to the bottom. The ridge 10 is preferably at least predominantly filled with debris material. The ridge 10 may, for example, have a rectangular or trapezoidal cross-section. The height of the ridge 10 of the cover layer 9 is essentially constant along the longitudinal axis 8 of the channel body 6.

Figure 3:
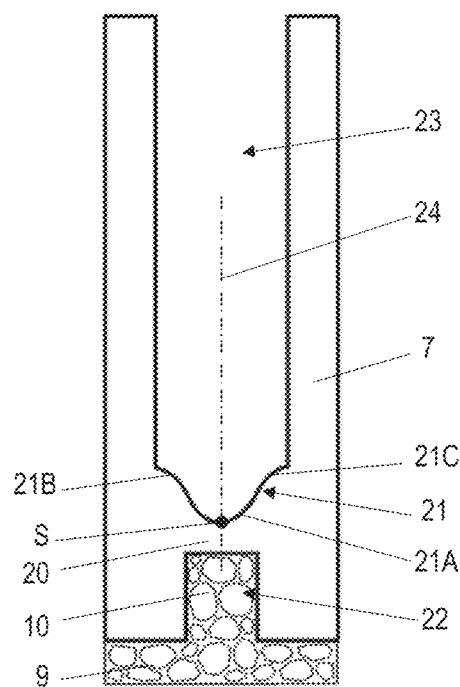
FIG. 3 shows a front view of a lamella according to the device for the migration of aquatic animals according to the invention.

FIG. 3 shows in a front view a lamella 7 according to the device 1 for the migration of aquatic animals according to the invention. The lamella 7 is plate-shaped and is arranged in the device 1 transversely to the longitudinal axis 8 of the channel body 6. The lamella 7 has a downwardly open lower cut-out 22, which is limited at the top by a transverse element 20. The cross-sectional area of the lower cut-out 22 is dimensioned such that the ridge 10 of the cover layer 9 may be accommodated in the lower cut-out 22. The upper edge of the transverse element 20 has a contour 21, which is inclined downwards from both sides towards the centre of the channel and defines a lower boundary of an upper cut-out 23 of the lamella extending upwards from the transverse element 20. In the present exemplary embodiment of the invention, the contour 21 is configured as a curved contour. The contour 21 of the upper edge of the transverse element 20 is formed symmetrically with respect to a width bisector 24 of the lamella. In the illustrated exemplary embodiment of the invention, the contour 21 of the upper edge of the transverse element 20 is comprised of curved sections along its entire course. A central section 21A of the curved contour 21 of the upper edge of the transverse element 20, i.e. central in relation to the bisector 24, is configured to be convex. More specifically, in this exemplary embodiment of the invention, the convex central section 21A is configured to be parabolic with the parabola vertex S as the lowest point, such that the parabolic central section 21A extends upward symmetrically with respect to the width bisector 24. I.e. the width bisector 24 simultaneously represents the parabola axis. The convex central section 21A of the curved contour 21 is adjoined on both sides by concave side sections 21B, 21C. These two concave side sections 21B, 21C form the end sections of the curved contour 21 of the upper edge of the transverse element 20, i.e. the concave side sections 21B, 21C end in the side walls of the upper cut-out 23. The upper cut-out 23 of the lamella is open at the top. As an alternative to the curved contour 21, although less preferred, there may be a contour having straight sections, which in the simplest embodiment may be implemented by a V-cut-out. However, as mentioned at the beginning, such an embodiment has deteriorated hydraulic properties in comparison to a curved contour.

In the illustrated embodiment of the lamella 7, the transverse element 20 is configured as an integral component of the lamella 7. In an alternative embodiment, however, the transverse element 20 may be configured as an independent, preferably replaceable component.

Figure 4:
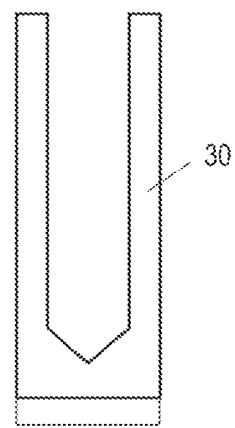
FIG. 4 shows in a front view a lamella, which is commonly used in the original Denil fish ladder according to prior art.
Figure 5:
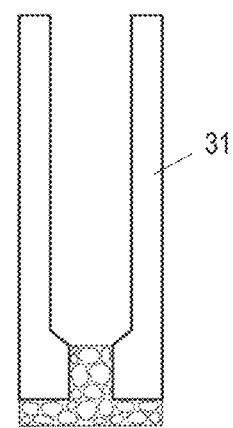
FIG. 5 shows a front view of a lamella of the modified Denil fish ladder according to prior art.

In the following, the advantageous hydraulic properties of the lamella 7 of the device 1 for migration of aquatic animals according to the invention are compared to the hydraulic properties of lamellae of the original Denil fish ladder and the modified Denil fish ladder according to AT 520908. For illustrative purposes, FIG. 4 shows a front view of a lamella 30 commonly used in the original Denil fish ladder. FIG. 5 shows a front view of a two-part lamella 31 of the modified Denil fish ladder according to AT 520908.

Figures 6A, 6B:
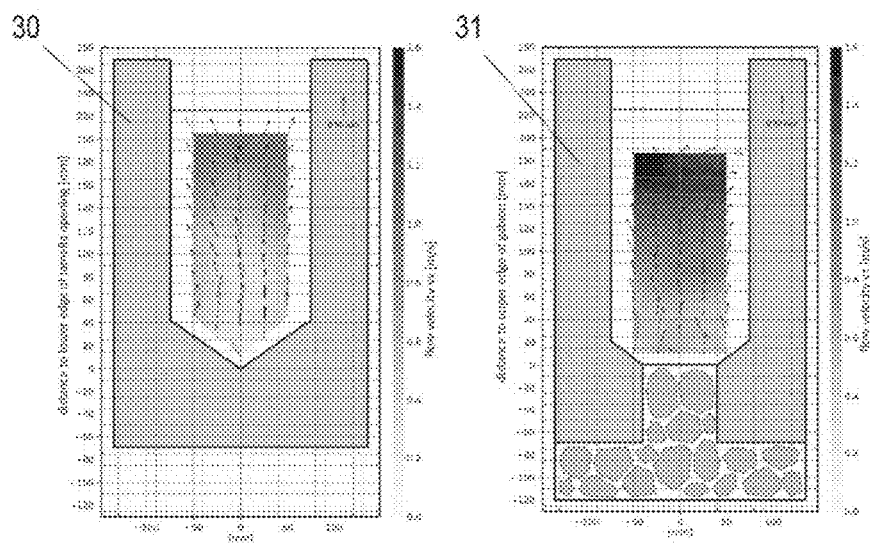
FIG. 6A shows a contour plot of the flow velocity distribution at the lamellae of the original Denil fish ladder.
FIG. 6B shows a contour plot of the flow velocity distribution at the lamellae of the modified Denil fish ladder according to AT 520908.
Figure 6C:
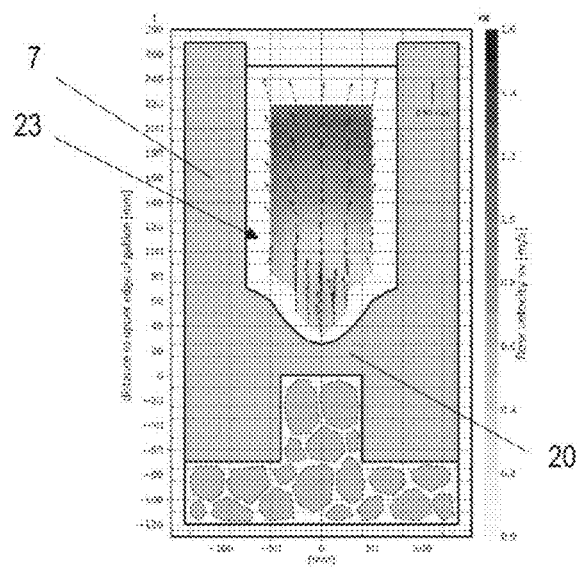
FIG. 6C shows a contour plot of the flow velocity distribution at the lamellae of the device for the migration of aquatic animals according to the invention.

The FIGS. 6A, 6B and 6C show contour plots of the flow velocity distribution at the lamellae 30 of the original Denil fish ladder (FIG. 6A), at the lamellae 31 of the modified Denil fish ladder according to AT 520908 (FIG. 6B), and at the lamellae 7 of the device 1 for the migration of aquatic animals according to the invention (FIG. 6C).

Figures 7A, 7B:
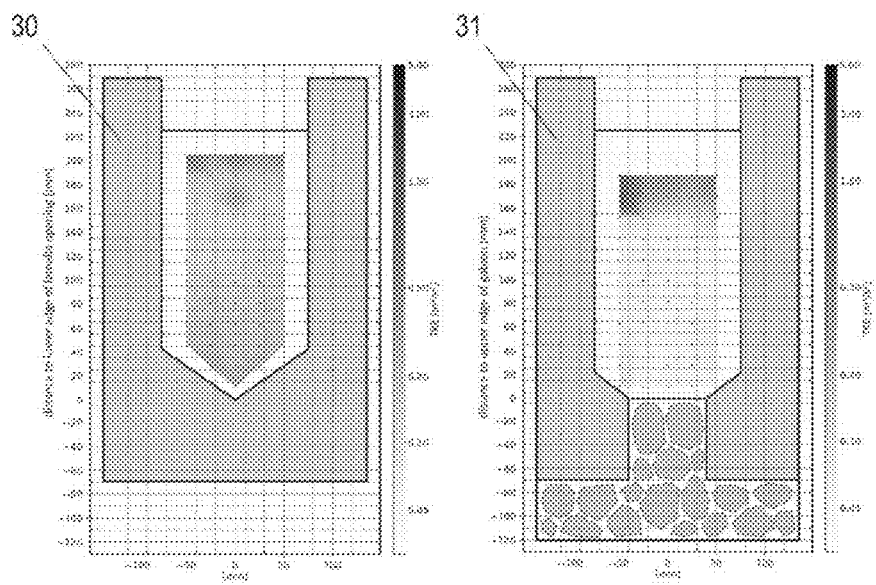
FIG. 7A shows a contour plot of the turbulent kinetic energy at the lamellae of the original Denil fish ladder.
FIG. 7B shows a contour plot of the turbulent kinetic energy at the lamellae of the modified Denil fish ladder according to AT 520908.
Figure 7C:
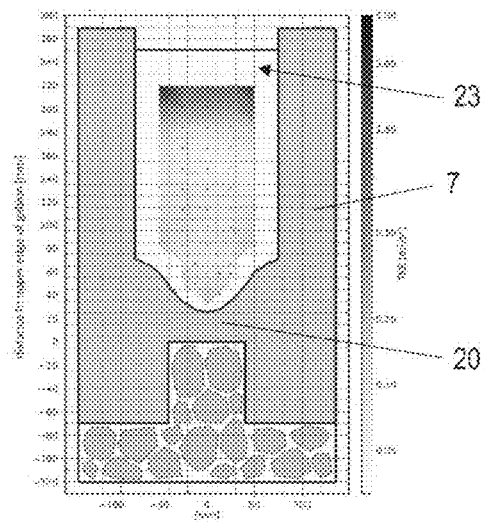
FIG. 7C shows a contour plot of the turbulent kinetic energy at the lamellae of the device for the migration of aquatic animals according to the invention.

The FIGS. 7A, 7B and 7C show contour plots of the turbulent kinetic energy at the lamellae 30 of the original Denil fish ladder (FIG. 7A), at the lamellae 31 of the modified Denil fish ladder according to AT 520908 (FIG. 7B), and at the lamellae 7 of the device 1 for the migration of aquatic animals according to the invention (FIG. 7C).

From the contour plots of the FIGS. 6A, 6B, 6C it may be seen that the flow velocities in the modified Denil fish ladder are significantly higher than in the original Denil fish ladder. Furthermore, it may be seen that the flow velocities in the device 1 for the migration of aquatic animals according to the invention are also higher in some sections than in the original Denil fish ladder, but are significantly lower than in the modified Denil fish ladder. Considering the distribution of the flow velocity, it may be seen that in the device 1 for the migration of aquatic animals according to the invention, the flow velocity is similarly low as in the original Denil fish ladder in a region from the curved contour 21 of the transverse element 20 upwards to about the middle of the height of the upper cut-out 23, and only above this does it show higher values. However, this lower region is relevant for the ascent of small aquatic animals and aquatic animals living close to the bottom. The flow velocity in the modified Denil fish ladder is generally higher than in the device 1 for the migration of aquatic animals according to the invention and higher than in the original Denil fish ladder.

From the contour plots of the FIGS. 7A, 7B, 7C it may be seen that the turbulent kinetic energy in the original Denil fish ladder is significantly higher than in the modified Denil fish ladder and higher than in the device 1 for the migration of aquatic animals according to the invention.

In summary, it is to be stated that the device 1 according to the invention for the migration of aquatic animals experiences a significant reduction in flow velocities compared to the prior art while maintaining the low turbulent kinetic energy. The illustration of the turbulent kinetic energy in the original Denil fish ladder in FIG. 7A also clearly illustrates that in the original Denil fish ladder an occurrence of high turbulence near the bottom is recorded, which accounts for the limited passability for a wide range of species. This problem will be completely solved by the present invention. In comparison to the modified Denil fish ladder, the present invention is characterized by a significant reduction in flow velocity, which thus makes it possible for weaker and smaller aquatic animals to pass the device 1 for the migration of aquatic animals, even with larger construction types. A significant achievement of the present invention lies in its hydraulic resilience, such that the fish ladder may also be expected to function in the event of reduced water flow, such as in the course of cage monitoring (the cage map is continuously displaced by floating matter such as foliage, which reduces the flow), which is a standardised method for biotic testing of fish ladders.

The invention claimed is:

1. A device for a migration of aquatic animals, the device comprising:
   at least one channel body with an upstream end and with a downstream end,
   wherein the channel body has a longitudinal axis extending between the upstream end and the downstream end,
   wherein a bottom of the channel body is provided, at least in sections along the longitudinal axis of the channel body, with a cover layer made of natural bottom substrate and/or debris material, and the cover layer has a ridge running essentially along the longitudinal axis,
   wherein plate-shaped lamellae are arranged in the channel body transversely to the longitudinal axis of the channel body,
   wherein the lamellae have a downwardly open lower cut-out, which is limited at a top by a transverse element, wherein a cross-sectional area of the lower cut-out is dimensioned in such a way to accommodate the ridge of the cover layer in the lower cut-out, wherein an upper edge of the transverse element has a contour, which is inclined towards a center and defines a lower boundary of an upper cut-out of the lamellae extending upwards from the transverse element.

2. A device according to claim 1, wherein the contour of the upper edge of the transverse element, which is inclined towards the center, is symmetrical with respect to a bisector (24) of a width of the lamellae.

3. A device according to claim 1, wherein the contour of the upper edge of the transverse element has a curved course at least in some sections.

4. A device according to claim 3, wherein the curved contour of the upper edge of the transverse element consists exclusively of curved sections.

5. A device according to claim 3, wherein a central section of the curved contour of the upper edge of the transverse element is configured to be convex.

6. A device according to claim 5, wherein the convex central section is configured to be parabolic with a parabolic vertex as a lowest point.

7. A device according to 5, wherein the convex central section is adjoined on both sides by concave side sections.

8. A device according to claim 7, wherein the concave side sections form end sections of the curved contour of the upper edge of the transverse element.

9. A device according to claim 1, wherein the contour of the upper edge of the transverse element has a straight course at least in some sections.

10. A device according to claim 1, wherein the transverse element is configured as an independent component.

11. The device according to claim 10, wherein the transverse element is configured as a replaceable component.

12. A device according to claim 1, wherein a height of the ridge of the cover layer is substantially constant along the longitudinal axis of the channel body.

* * * * *